Patented Mar. 7, 1944

2,343,437

UNITED STATES PATENT OFFICE 2,343,437

FILTER

Donald H. Wells, Maplewood, N. J., and Melvin De Groote, University City, Mo., assignors to Purolator Products, Inc., Newark, N. J., a corporation of Delaware No Drawing. Application February 26, 1941, Serial No. 381,128

19 Claims. (Cl. 252—326)

This invention relates to filtration and filters therefor and relates more particularly to filtration of lubricating oil of internal combustion engines for the removal of solids therefrom.

The lubricating oil of an internal combustion engine, particularly a Diesel type engine, contains minute solids which filtering media, such as cloth, paper, cotton linters, wood pulp and the like, require considerable time to remove. The dirt removal rate of such filtering media depends upon a number of different conditions such as, in depth type filters, the method of assembling the medium, the density of the packing of the medium, the distribution of the oil passing therethrough, temperature, pressure and a number of other variables. In filters of the extended area type, the amount of surface area, temperature, pressure, viscosity of the oil and other factors affect the dirt removal rate.

An object of this invention is to increase sharply the dirt removal rate of filtering media of the types above mentioned.

We have found that in filtering lubricating oil of internal combustion engines the dirt removal rate of filtering media may be sharply increased by contacting the oil that is filtered by the filtering media with an acidic carboxylic amide derivable by amidification reaction involving a carboxyl group of a polybasic carboxylic acid and an amino hydrogen atom of an amine containing at least one high molecular weight aliphatic radical. The acidic carboxylic amide may be added to the filtering medium in order to increase the dirt removal rate of the filtering medium or may be contacted in some other way with oil passing through the filtering medium. Preferably the amide product is used according to this invention by including it in a filter for use in the lubricating system of an internal combustion engine so as to provide an improved filter having a high dirt removal rate.

Polybasic carboxy acids which may be employed in the esterification reaction may be exemplified by phthalic, succinic, malic, fumaric, citric, citriconic, maleic, adipic, tartaric, oxalic, malonic, diglycollic, or the like. The anhydrides of such polybasic carboxy acids such as phthalic anhydride, maleic anhydride, etc., are the equivalents of the acids and in some respects are even more advantageous than the acids in the production of amides. When reference is made to polybasic carboxy acids the anhydrides thereof are also included. Other suitable polybasic acids may be prepared by the diene synthesis which involves condensation of alpha, beta, unsaturated acids or anhydrides with compounds containing a conjugated double bond. For example, the condensation of maleic anhydride with alpha terpinene yields a dicarboxy acid which is suitable. Other polybasic carboxy acids may be prepared similarly by the diene synthesis involving condensation of an alpha, beta unsaturated monocarboxy acid with a carboxy acid containing a conjugated double bond. For example, crotonic acid may be condensed with abietic acid, which contains a conjugated double bond, to yield a dicarboxy acid suitable for use in the manufacture of amide products in increasing the rate of dirt removal from lubricating oils in a filtering operation. Functional equivalents of polybasic carboxy acids, such as chlorphthalic acid, may be employed.

An amine containing at least one free hydrogen atom attached to an amino-nitrogen atom (i. e., either a primary or a secondary amine) and having at least one high mole aliphatic radical may be caused to react with at least one equi-molecular amount of a polybasic carboxy acid to form acidic carboxylic amides of the character above mentioned. By carboxylic amides which are "acidic" we refer to carboxylic amides which contain at least one carboxyl group (COOH) wherein the acidic hydrogen is present. Such reaction is preferably conducted using the anhydrides of dibasic carboxy acids in which the carboxyl groups are adjacent, namely, are linked together or to adjacent carbon atoms, examples of such acids being oxalic, succinic, maleic, phthalic, etc. Such acidic carboxylic amides and the manufacture thereof are known and when neutralized to form soluble compounds have been used as wetting agents for use in laundering or the like. In this connection attention is called to U. S. Patent No. 2,191,738 dated February 27, 1940, and also to "Reactions of Organic Compounds," W. J. Hickinbottom, 1936, p. 198. It may be well to emphasize that in the present instance one is not concerned with the salt form but with modifications in which the materials are in acidic form. So far as we are aware such compounds in acidic condition have not been used commercially for any purpose. As aforesaid we have found that the acidic carboxylic amides above referred to have the property of sharply increasing the dirt removal rate of filtering media in filtering the lubricating oil of internal combustion engines.

The reaction between a dibasic carboxy acid anhydride such as phthalic anhydride and an amine containing a high mole aliphatic radical, R, may be represented as follows, by way of example,

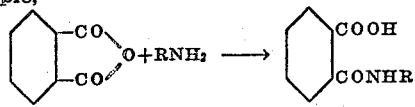

The resulting product is an acidic carboxylic amide suitable for use in increasing the dirt removal rate of filtering media according to this invention. A similar reaction may be caused to take place utilizing a secondary amine instead of a primary amine.

Suitable amines are those which preferably contain an aliphatic radical having at least 8 carbon atoms. The aliphatic radical usually has 8 to 18 carbon atoms but may have as high as 40 carbon atoms. Such amines may be prepared from fatty substances of vegetable origin, as for example amines corresponding to the fatty acids contained in palm kernel oil, coconut oil, soy bean oil, rapeseed oil, poppy-seed oil, tallow, train oil, tall oil or sperm oil as for example octylamine, dodecylamine, myristylamine, cetylamine or oleylamine. In many cases mixtures of amines containing a high molecular weight aliphatic radical, such as can be obtained from mixtures of fatty acids contained in oils or fats are also suitable as initial materials. Amines which contain in addition a low mole organic group in an amino-hydrogen atom position, e. g., methyl, ethyl, benzyl, etc., are also suitable. The high molal aliphatic radicals contemplated herein as amino hydrogen atom substituents may be purely aliphatic, such as octyl, dodecyl, etc., or may be cycloaliphatic, or aralkyl such as naphthylethylamine, or alicyclic such as dicyclohexyl amine. Cycloaliphatic amines include compounds such as abietylamine and the amines corresponding to the naphthenic acids are also suitable in initial materials. The high molal aliphatic radical linked to the nitrogen atom may also be substituted, for example, by halogen atoms, or may be interrupted by atoms other than carbon atoms, e. g. by one or more oxygen atoms. Such radicals are functional equivalents of ordinary aliphatic radicals. Amines which comprise a hydrocarbon group or radical having at least 8 carbon atoms are, however, preferred. Simple aliphatic radicals are also preferable to cycloaliphatic radicals.

For purposes of brevity most of the acidic carboxylic amides which are suitable for increasing the dirt removal rate of filtering media according to this invention may be represented by the following formula:

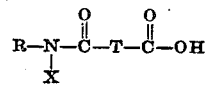

wherein R represents an aliphatic (including cycloaliphatic) radical having at least 8 carbon atoms; X represents a hydrogen atom or any organic radical; and T represents a polybasic carboxylic acid residue which may be a single valency or an alkylene or arylene radical. The group represented by X may, for instance, be one such as R or one having fewer than 8 carbon atoms.

In the structural formula immediately preceding the radical

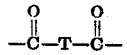

is the conventional acyl radical with particular significance in the case of the dicarboxy acids. Thus the preceding formula can be conveniently re-written,

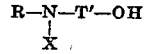

in which all the characters have their preceding significance and T' is the polycarboxy acyl radical and more particularly a dicarboxy acyl radical. Specifically T' may represent the oxalyl, maleyl, phthalyl, malyl, succinyl or similar acyl radicals. Such presentation has the advantage that there is no incongruity in regard to oxalic acid. A reexamination of the prior structural form involving T and not T' reveals that actually T does not exist (becomes a single valency) in the instance of oxalic acid, since the two carboxyl radicals are directly joined without an intervening element or radical. Since oxalic acid is possibly the best known and most typical dibasic acid, the formula involving T' will hereinafter be employed so as to more correctly portray actual chemical structure in all instances.

The acidic carboxylic amides may be prepared by simply heating the polybasic carboxylic acid or anhydride and primary or secondary amine, generally in approximately equi-molecular proportions, until the reaction is complete. Generally temperatures between 60° and 250° C. and preferably from 100° to 200° C. are employed. If desired the reaction may be caused to take place in the presence of an organic solvent or diluent which does not react with the reacting materials, and if water is formed as a reaction product the materials may be heated under a reflux condenser using a water trap to remove the water as it is formed. The reaction may also be hastened by passing a dried inert gas through the materials such as nitrogen or $CO_2$. Suitable solvents or diluents are, for example, benzine, chlorinated low molecular hydrocarbons, aliphatic or cycloaliphatic alcohols or ketones and the like.

The polybasic carboxylic acid is preferably employed in acid form. If however one obtains an alkali metal salt then the resulting product should be treated to afford a final product that is acidic. This can be accomplished as by treating the alkali metal salt with a dilute organic or mineral acid. In the case of an ester acidification this can be accomplished by saponifying the ester with an alkali to form a salt and then treating the salt with a dilute acid. The water insoluble acid material can be recovered by decantation, filtration, or by any other suitable treatment.

The following examples illustrate the preparation of acidic carboxylic amides suitable for increasing the dirt removal rate of filtering media according to this invention, the parts being by weight.

*Example 1*

100 parts of oleylmethylamine and 500 parts of diethyl oxalate are heated to boiling for three hours and the excess of ester is then distilled off in vacuo. The reaction product is saponified in the cold in alcoholic solution while employing caustic soda in slight excess. The solution of the sodium salt is then acidified with any suitable dilute acid such as a dilute mineral acid or a dilute solution of acetic acid. The insoluble amide acid is recovered by filtration, decantation, solvent extraction or any other suitable means.

*Example 2*

100 parts of an amine obtainable by the reaction of a bromide on the alcohols corresponding to the fatty acids in palm kernel oil and methylamine are caused to react with 500 parts of diethyl oxalate in the manner described in Example 1 preceding. The resulting material is then saponified with an alkali and subsequently acidified in order to recover the acidic carboxylic amide as described in Example 1.

*Example 3*

100 parts of an amine mixture obtainable from the alcohols of sperm oil are caused to react with 500 parts of oxalic acid diethyl ester in the manner described in Example 1. Saponification is effected by means of triethanolamide in alcoholic solution and the resulting salt is obtained by evaporating the alcoholic solution. The product is then acidified and recovered in acidic form as described in Example 1.

Example 4

50 parts of dicyclohexylamine and 50 parts of phthalic anhydride are heated while stirring to about 50° C., the reaction thus taking place with an increase in temperature. The reaction mixture is stirred for another hour at 100° C. whereby it gradually becomes solid. The product thus obtained is in acidic form and does not require further reaction.

Example 5

37 parts of maleic anhydride are added while stirring to 100 parts of the mixture of amines obtained by the reaction of bromides of the alcohols corresponding to the fatty acids of coconut oil with methyl amine, the temperature thus rising to 90° C. and being kept at this temperature by appropriate cooling. The product thus obtained is acidic and does not require further reaction.

Example 6

100 parts of a mixture of amines obtainable by catalytic hydrogenation of lauric acid nitrile in the presence of methylamine are caused to react with 500 parts of oxalic acid diethyl ester in the manner described in Example 1. The condensation product is saponified and any small amounts of by-products are removed by means of petroleum ether. The product thus formed is converted into the acidic form and is recovered in the manner indicated in Example 1.

It is preferable that the acidic carboxylic amide be substantially oil-insoluble or of low oil solubility. If the ester product is such that only one part or less is soluble (as determined by usual visual methods) in one thousand parts of ordinary straight-run kerosene from Pennsylvania crude, the product is regarded as substantially insoluble in oil. On the other hand, absolute insolubility in oil is not desired. However, even a trace of solubility such as a few parts dissolving in one hundred thousand parts of kerosene of the character above mentioned affords a satisfactory product for increasing the filtering rate of filtering media in the practice of this invention.

The acidic carboxylic amides hereinabove described are soluble in lower aliphatic alcohol solutions (ethyl to octyl). They are particularly soluble in alcohols of about 50% strength such as 50% aqueous solutions of ethyl alcohol, propyl alcohol etc. This fact facilitates application of the acidic amides to filters and to filtering media.

The acidic amide product above described when used in conjunction with a filter in a filtering operation sharply increases the dirt removal rate of the filter. The product may be used in a number of different ways. Thus, in a paper type filter the product, either by itself or mixed with a solvent such as alcohol, preferably is applied to the surface of the paper covering all or a portion of the total paper surface exposed to oil. Cloth filters may be similarly treated. Cotton linters filters preferably are treated by adding the product either diluted or undiluted to cotton linters either on the surface or throughout the body thereof. Other filtering mediums sufficiently porous to permit oil to flow therethrough but sufficiently compact to filter out solid particles may be similarly treated. The product is also effective when incorporated in filters or filter mediums in other ways than those above mentioned. Moreover, whenever the product is permitted to contact oil that passes through the filtering medium it is effective to increase the rate of dirt removal by the filtering medium. Thus, if the product is applied to a screen or the like through or past which the oil passes before reaching the filtering medium, the dirt removal rate of the medium is increased. If the product is merely introduced into the casing within which the filtering medium is contained, it is effective.

The amount of the product that is used depends upon the increase in dirt removal rate that is desired. Ordinarily, for commercial purposes a small amount, such as about 2 to 25 grams, is all that is desirable for use in connection with a filter of proper size for the average automobile. Use of as little as 4 grams gives a very pronounced increase in dirt removal rate and the dirt removal rate is only slightly increased by using 5 or 6 times this amount.

As above mentioned, the use of an additive of the type above defined sharply increases the dirt removal rate. In other words, when a filtering operation is carried on using these additives in conjunction with a filter, a single filter can be made which can remove dirt as fast as the dirt could be removed by the use of a plurality of untreated filters. In thus increasing the dirt removal rate, the improved result is secured chiefly through a greater removal of solids in a single passage through the filtering medium.

The improvements in the rate of dirt removal from lubrication oil that may be effected by the additives herein defined, have been tested by the following procedure. From a heated tank containing six quarts of oil, oil was withdrawn by a pump and forced continuously at 45 pounds per square inch pressure into a standard type automobile filter and the filtered oil was returned to the tank. Starting with clean oil, 5 grams of solids of the type formed in automobiles were added to the oil in the tank in such manner as to be thoroughly distributed throughout the oil in the tank, and observation was made of this oil to determine the number of minutes required to clean it to .02% solid content after each addition of the dirt. At two-hour intervals, additional 5-gram dirt charges were added and observations made of the length of time required to clean the oil in the tank to .02% solids after each dirt addition. Comparative tests were run with two sets of similar filters, the filters of one set being treated with the additive and the filters of the other set not being so treated. After each filter had reached the condition where oil in the tank contained .1% solids two hours after the dirt was added, the amount of dirt in the filter was determined by subtracting the amount of dirt remaining in the tank from the amount of dirt added during the test. The results for each set of filters were averaged. Using ester products above described, it was found that the treated filter cleaned up the first addition of dirt much more rapidly than the untreated filter and with subsequent dirt additions, the advantage in favor of the treated filter persisted. The life of the treated filter was not materially greater than that of the untreated filter.

According to this invention, additives that sharply increase the dirt removal rate of filtering media are made available which retain their effectiveness for the full life of the filter, withstand the temperatures encountered in internal combustion engine lubrication without volatilization, remain absorbed or deposited on the filtering medium during its use, and impart no injurious effects to the oil being filtered. The additive may be used without requiring any material change in the manufacture of the filter. Because of the faster dirt removal rate resulting from the use of the additive, the treated filter reduces the accumulation of solid particles and abrasive matter in the lubricant materially below that obtainable by a similar filter that has not been treated and thereby enhances the efficacy of the lubricant.

While this invention has been described in connection with a number of examples of products suitable for use in increasing the dirt removal rate of filtering media according to this invention, it is to be understood that this has been done merely for the purpose of illustration and exemplification and that the scope of this invention is to be governed by the language of the following claims considered in the light of the foregoing description.

We claim:

1. A filter for use in connection with the lubricating system of an internal combustion engine, said filter comprising a casing containing a filtering medium which is sufficiently porous to permit oil to flow therethrough but sufficiently compact to filter out solid particles, said filter comprising for contact with oil passing therethrough an agent for increasing the dirt removal rate of said filtering medium, said agent comprising an acidic carboxylic amide derivable by amidification reaction involving a carboxyl group of a polybasic carboxylic acid and an amino-hydrogen atom of an amine containing at least one high molecular weight aliphatic radical.

2. A filter according to claim 1 wherein said high molecular weight aliphatic radical contains at least 8 carbon atoms.

3. A filter according to claim 1 wherein said high molecular weight aliphatic radical contains at least 8 carbon atoms and said polybasic carboxylic acid is a dibasic carboxylic acid having adjacent carboxyl groups.

4. A filter according to claim 1 wherein said high molecular weight aliphatic radical is a hydrocarbon radical having at least 8 carbon atoms.

5. A filter according to claim 1 wherein said high molecular weight aliphatic radical contains at least 8 carbon atoms and said polybasic carboxylic acid is phthalic acid.

6. A filter according to claim 1 wherein said high molecular weight aliphatic radical contains at least 8 carbon atoms and said polybasic carboxylic acid is maleic acid.

7. A filter according to claim 1 wherein said high molecular weight aliphatic radical contains at least 8 carbon atoms and said polybasic carboxylic acid is oxalic acid.

8. A filter according to claim 1 wherein said acidic carboxylic amide is substantially insoluble in oil.

9. A filter for use in connection with the lubricating system of an internal combustion engine, said filter comprising a casing containing a filtering medium which is sufficiently porous to permit oil to flow therethrough but sufficiently compact to filter out solid particles, said filter comprising for contact with oil passing therethrough an agent for increasing the dirt removal rate of said filtering medium, said agent comprising an acidic carboxylic amide represented by the formula $$R-N-T'-OH$$
$$|$$
$$X$$

wherein R represents an aliphatic (including cycloaliphatic) radical having at least 8 carbon atoms; X represents a hydrogen atom or any organic radical; and T' represents a dicarboxy acyl radical.

10. A filter for use in connection with the lubricating system of an internal combustion engine, said filter comprising a casing containing a filtering medium which is sufficiently porous to permit oil to flow therethrough but sufficiently compact to filter out solid particles, said medium having applied thereto as an agent to increase the dirt removal rate of said filtering medium an acidic carboxylic amide derivable by amidification reaction involving a carboxyl group of a polybasic carboxylic acid having adjacent carboxyl groups and an amino hydrogen atom of an amine containing at least one aliphatic radical having at least 8 carbon atoms.

11. A method of increasing the dirt removal rate of a filtering medium for removing dirt from the lubricating oil of an internal combustion engine, said method comprising contacting oil that is to be filtered by said medium with an acidic carboxylic amide represented by the formula $$R-N-T'-OH$$
$$|$$
$$X$$

wherein R represents an aliphatic (including cycloaliphatic) radical having at least 8 carbon atoms; X represents a hydrogen atom or any organic radical; and T' represents a dicarboxy acyl radical.

12. A method of increasing the dirt removal rate of a filtering medium for removing dirt from the lubricating oil of an internal combustion engine, said method comprising contacting oil that is to be filtered by said filtering medium with an acidic carboxylic amide derivable by amidification reaction involving a carboxyl group of a polybasic carboxylic acid and an amino hydrogen atom of an amine containing at least one high molecular weight aliphatic radical.

13. A method according to claim 12 wherein said high molecular weight aliphatic radical contains at least 8 carbon atoms.

14. A method according to claim 12 wherein said high molecular weight aliphatic radical contains at least 8 carbon atoms and said polybasic carboxylic acid is a dibasic carboxylic acid having adjacent carboxyl groups.

15. A method according to claim 12 wherein said high molecular weight aliphatic radical is a hydrocarbon radical having at least 8 carbon atoms.

16. A method according to claim 12 wherein said high molecular weight aliphatic radical contains at least 8 carbon atoms and said polybasic carboxylic acid is phthalic acid.

17. A method according to claim 12 wherein said high molecular weight aliphatic radical contains at least 8 carbon atoms and said polybasic carboxylic acid is maleic acid.

18. A method according to claim 12 wherein said high molecular weight aliphatic radical contains at least 8 carbon atoms and said polybasic carboxylic acid is oxalic acid.

19. A method according to claim 12 wherein said acidic carboxylic amide is substantially insoluble in oil.

DONALD H. WELLS.
MELVIN DE GROOTE.